US008368678B2

(12) United States Patent
Seto

(10) Patent No.: US 8,368,678 B2

(45) Date of Patent: Feb. 5, 2013

(54) PIXEL CIRCUIT, DISPLAY APPARATUS, AND PIXEL CIRCUIT DRIVE CONTROL METHOD

(75) Inventor: Yasuhiro Seto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 905 days.

(21) Appl. No.: 12/412,033

(22) Filed: Mar. 26, 2009

(65) Prior Publication Data

US 2009/0244046 A1 Oct. 1, 2009

(30) Foreign Application Priority Data

Mar. 26, 2008 (JP) ................................. 2008-079794

(51) Int. Cl.
*G06F 3/038* (2006.01)

(52) U.S. Cl. ............. 345/211; 345/214; 345/76; 345/82

(58) Field of Classification Search .................... 345/82, 345/211, 76, 214; 428/447; 315/169; 257/140
See application file for complete search history.

(56) References Cited

U.S. PATENT DOCUMENTS 5,684,365 A 11/1997 Tang et al.
6,551,717 B2 * 4/2003 Katz et al. ..................... 428/447
7,038,392 B2 * 5/2006 Libsch et al. .............. 315/169.3
7,414,600 B2 * 8/2008 Nathan et al. ................... 345/82
7,855,701 B2 * 12/2010 Yoo ................................ 345/82
2005/0017930 A1 * 1/2005 Kobayashi et al. ............. 345/76
2005/0067970 A1 * 3/2005 Libsch et al. .............. 315/169.3
2007/0080906 A1 * 4/2007 Tanabe ............................ 345/76
2007/0257256 A1 * 11/2007 Kugler ............................ 257/40
2008/0170010 A1 * 7/2008 Kim ................................ 345/76
2009/0096722 A1 * 4/2009 Moriya et al. .................. 345/76
2009/0096773 A1 * 4/2009 Moriya et al. ................ 345/205

FOREIGN PATENT DOCUMENTS

JP 2003-255856 A 9/2003
JP 2005195756 A 7/2005
JP 2008009275 A 1/2008

OTHER PUBLICATIONS

Chang Jung Kim, et al., "Highly Stable $Ga_2O_3$-$In_2O_3$-ZnO TFT for Active-Matrix Organic Light-Emitting Diode Display Application", IEDM (International Electron Device Meeting) 2006, Samsung Advance Institute of Technology, 4 pages.
Japanese Office Action for JP 2008-079794; Apr. 17, 2012.

* cited by examiner

*Primary Examiner* — Thuy Pardo
(74) *Attorney, Agent, or Firm* — Sughrue Mion, PLLC

(57) ABSTRACT

A pixel circuit including a light emitting element, a driving transistor, connected to the light emitting element, that applies a drive current to the light emitting element, a holding circuit connected to a gate terminal of the driving transistor, and a switching transistor connected between the holding circuit and a data line through which a data signal to be held by the holding circuit flows, in which the driving transistor and the switching transistor are inorganic oxide thin film transistors whose OFF-operation threshold voltage is a negative voltage, and the holding circuit includes a first capacitor element connected between the switching transistor and the gate terminal of the driving transistor, and a second capacitor element connected between a point located between the first capacitor element and the gate terminal of the driving transistor and a voltage source that supplies a negative voltage.

3 Claims, 4 Drawing Sheets

FIG.7
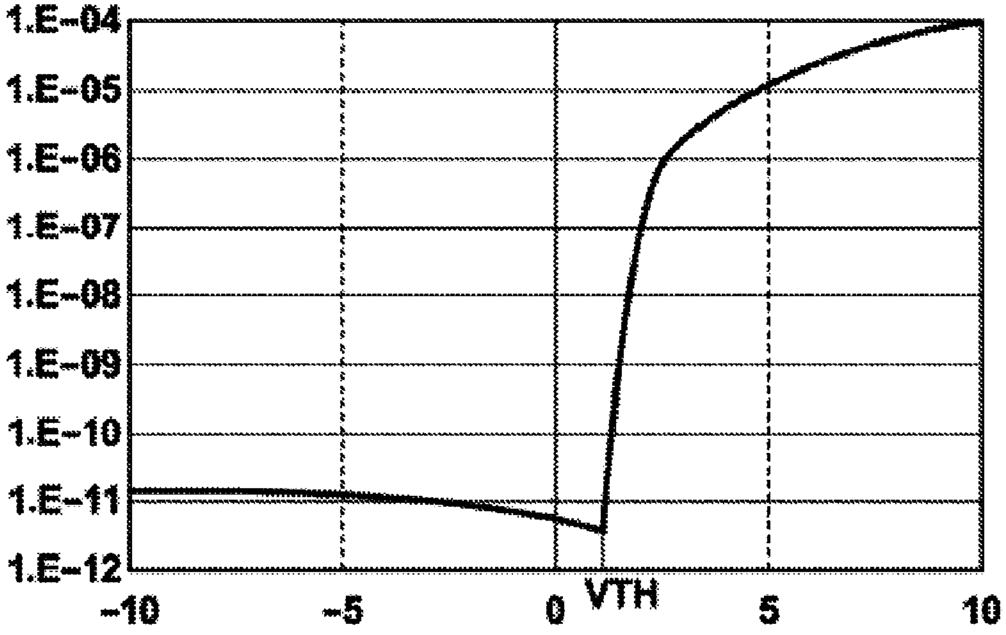
FIG.8 *Prior Art*
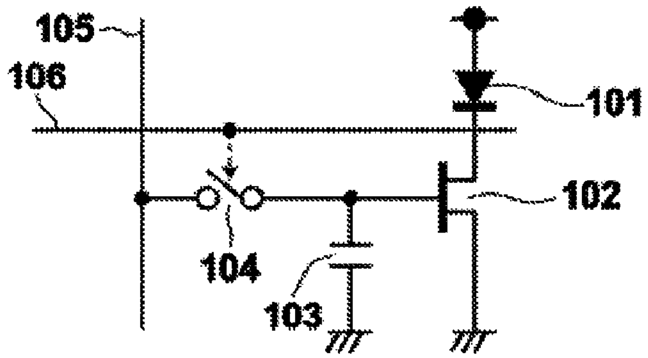

FIG.9 *Prior Art*
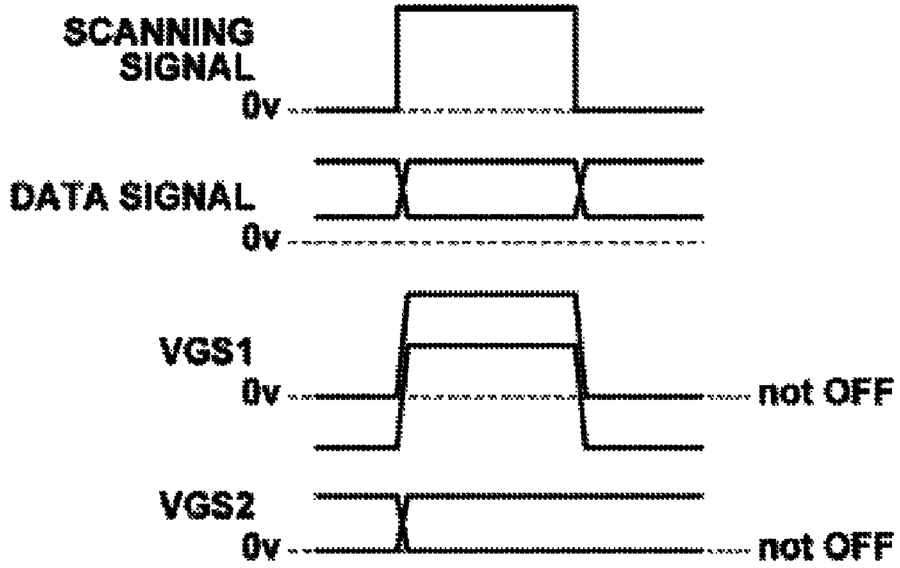
FIG.10
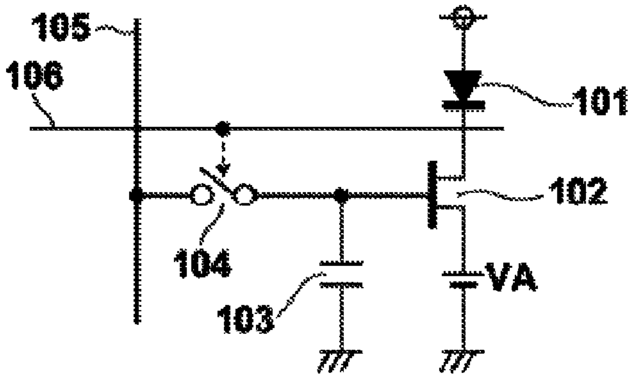

PIXEL CIRCUIT, DISPLAY APPARATUS, AND PIXEL CIRCUIT DRIVE CONTROL METHOD

BACKGROUND OF THE INVENTION

1. Field of the Invention

The present invention generally relates to a pixel circuit and display apparatus having a light emitting element driven by active matrix method, and a pixel circuit drive control method, and more particularly to a pixel circuit using an inorganic oxide thin film transistor.

2. Description of the Related Art

Display devices using light emitting elements, such as organic EL element and the like, are proposed for use in various fields including televisions, cell phone displays, and the like.

Generally, organic EL elements are current-driven light emitting elements, thus pixel circuits including an organic EL element proposed have a configuration like that shown in FIG. 8 as described, for example, in U.S. Pat. No. 5,684,365.

The pixel circuit shown in FIG. 8 includes switching transistor 104, capacitor element 103, and driving transistor 102 as a minimum configuration. In the configuration, when switching transistor 104 is turned ON, a data signal, which will serve as a gate voltage of driving transistor 102, is written in capacitor element 103, and the gate voltage according to the data signal is applied to driving transistor 102 so as to perform constant current operation, whereby a drive current flows through organic EL element 101 and light is emitted from the device.

In conventional pixel circuits, low-temperature polysilicon or amorphous silicon thin film transistors are used as the switching transistor and driving transistor.

The low-temperature polysilicon thin film transistor may provide high mobility and high stability of threshold voltage, but has a problem that the mobility is not uniform. The amorphous silicon thin film transistor may provide uniform mobility, but has a problem that the mobility is low and threshold voltage varies with time. The non-uniform mobility and instable threshold voltage appear as irregularities in the display image.

Consequently, Japanese Unexamined Patent Publication No. 2003-255856 proposes a pixel circuit having therein a compensation circuit for correcting the threshold voltage.

The provision of the compensation circuit, however, causes the pixel circuit to become complicated, resulting in increased cost due to low yield rate and low aperture ratio.

As such, thin film transistors made of inorganic oxide films, as typified by IGZO, have recently been drawing attention. The thin film transistors made of inorganic oxide films allow low-temperature film forming and have features of providing sufficient mobility, highly uniform mobility, and low threshold voltage variation with time.

Where thin film transistors are fabricated with inorganic oxide films in order to obtain various desired characteristics and when trying to obtain desired current characteristics, however, the threshold voltage that causes the transistors to perform OFF operation may sometimes become a negative voltage.

For example, when trying to control a thin film transistor, used as the driving transistor whose OFF-operation threshold voltage is a negative voltage like that described, for example, "Highly Stable $Ga_2O_3$—$In_2O_3$—ZnO TFT for Active-Matrix Organic Light-Emitting Diode Display Application", C. J. Kim et al., IEDM (International Electron Device Meeting) 2006, Samsung Advanced Institute of Technology (Non-Patent Document 1) by the data driving circuit of a conventional organic EL display device, the minimum setup value of the gate voltage of the driving transistor of the conventional data driving circuit is 0 v, so that a minimum drive current, which is the value when gate-source voltage VGS of the driving transistor is 0 v, flows through the organic EL element, thus unable to cause the EL element to stop the emission. Further, the switching transistor is unable to fully perform OFF operation when VGS=0 v, whereby the gate voltage of the driving transistor can not be maintained.

FIG. 9 shows voltage waveforms of scanning signal, data signal, gate-source voltage VGS1 of switching transistor 104 and gate-source voltage VGS2 of driving transistor 102 when the thin film transistor described in Non-Patent document 1 is used in the pixel circuit shown in FIG. 8.

Use of thin film transistors whose OFF-operation threshold voltage is a negative voltage as switching transistor 104 and driving transistor 102 results in that they are unable to perform OFF operation as shown in FIG. 9, therefore unable to cause organic EL element to stop the emission, or unable to maintain VGS2 of driving transistor 102, whereby black drifting phenomena and cross-talk phenomena occur and image quality of display image is degraded.

In order to solve the problems described above, it is conceivable to provide a voltage source to set the ground wire of the pixel circuit at a voltage (VA) higher than 0 v, as shown in FIG. 10. But this method greatly increases power consumption of the display device as a whole, whereby the feature of low power consumption of EL element is spoiled.

It is also conceivable to set the ground wires of the data drive circuit that supplies data signal and the scan drive circuit that supplies scanning signal at a voltage higher than 0 v, thereby causing the data signal and scanning signal to become negative. But in order to ensure the data connection level with an external device, it is necessary to newly develop a dedicated IC, which becomes a cost increase factor of the display device.

In view of the circumstances described above, it is an object of the present invention to provide a pixel circuit that uses an inorganic oxide thin film transistor whose OFF-operation threshold voltage is a negative voltage, yet does not increase power consumption and allows the use of a conventional driving circuit, a display apparatus that uses the pixel circuit, and a method for drive controlling the pixel circuit.

SUMMARY OF THE INVENTION

A first pixel circuit of the present invention is a circuit, including:

a light emitting element, a driving transistor, connected to the light emitting element, that applies a drive current to the light emitting element, a holding circuit connected to a gate terminal of the driving transistor, and a switching transistor connected between the holding circuit and a data line through which a data signal to be held by the holding circuit flows, wherein:

the driving transistor and the switching transistor are inorganic oxide thin film transistors whose OFF-operation threshold voltage is a negative voltage; and the holding circuit includes a first capacitor element connected between the switching transistor and the gate terminal of the driving transistor, and a second capacitor element connected between a point located between the first capacitor element and the gate terminal of the driving transistor and a voltage source that supplies a negative voltage.

A display apparatus of the present invention is an apparatus, including:

an active matrix substrate on which the pixel circuit of the present invention described above is disposed in a large number;

a scan drive circuit that supplies to each switching transistor a scanning signal for turning ON/OFF each switching transistor; and a data drive circuit that supplies the data signal to be held by the holding circuit, wherein the scan drive circuit is a circuit that supplies a positive voltage as the scanning signal and the data drive circuit is a circuit that supplies a positive voltage as the data signal.

In the display apparatus of the present invention, the negative voltage VB supplied to the second capacitor element, a capacitance C1 of the first capacitor element, a capacitance C2 of the second capacitor element, and the threshold voltage VTH may satisfy the relationship of Formula (1) below, and a minimum setting value $V_{datamin}$ of the data signal, an OFF scan signal $V_{scan(off)}$, and the threshold voltage VTH may satisfy the relationship of Formula (2) below.

$$VB \leqq (1+2\times C2/C1)\times VTH \quad (1)$$

$$V_{datamin} \geqq V_{scan(off)} - VTH \quad (2)$$

A second pixel circuit of the present invention is a circuit, including a light emitting element and an inorganic oxide thin film transistor whose OFF-operation threshold voltage is a negative voltage, wherein a negative voltage is used as the gate-source voltage of the inorganic oxide thin film transistor to control the drive current of the light emitting element.

A pixel circuit drive control method of the present invention is a method for drive controlling a pixel circuit having a light emitting element and an inorganic oxide thin film transistor whose OFF-operation threshold voltage is a negative voltage, wherein a negative voltage is used as the gate-source voltage of the inorganic oxide thin film transistor to control the drive current of the light emitting element.

According to the first pixel circuit and display apparatus of the present invention, inorganic oxide thin film transistors whose OFF-operation threshold voltage is a negative voltage are used as the driving transistor and switching transistor. In addition, a first capacitor element is provided between the switching transistor and a gate terminal of the driving transistor, and a second capacitor element is provided between a point located between the first capacitor element and the gate terminal of the driving transistor and a voltage source that supplies a negative voltage. This allows a voltage divided by the first and second capacitor elements to be supplied to the gate terminal of the driving transistor, so that a conventional drive circuit may be used without increasing power consumption.

According to the second pixel circuit and drive controlling method therefor of the present invention, a pixel circuit having a light emitting element and an inorganic oxide thin film transistor whose OFF-operation threshold voltage is a negative voltage is constructed, and a negative voltage is used as the gate-source voltage of the inorganic oxide thin film transistor to control the drive current of the light emitting element. This may provide advantageous features of inorganic thin film transistor, including sufficient mobility, highly uniform mobility, and low threshold voltage variation with time.

BRIEF DESCRIPTION OF THE DRAWINGS

FIG. 7 illustrates one example characteristic of a thin film transistor whose OFF-operation threshold voltage is a positive voltage.

FIG. 8 illustrates a conventional pixel circuit, illustrating the configuration thereof.

FIG. 9 illustrates voltage waveforms of scanning signal and data signal, and voltage waveforms of gate-source voltage VGS1 of the switching transistor and gate-source voltage VGS2 of the driving transistor of the conventional display device.

FIG. 10 illustrates the ground wire of a pixel circuit provided with a voltage source.

DESCRIPTION OF THE PREFERRED EMBODIMENTS

Figure 1:
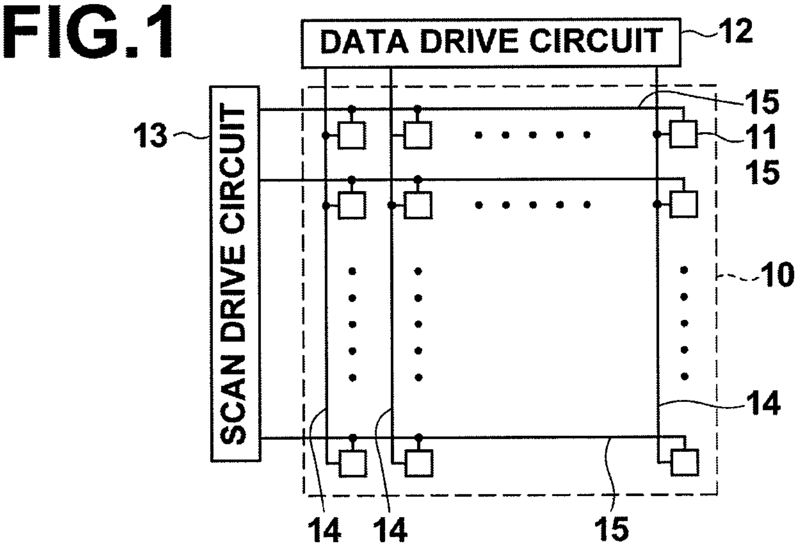
FIG. 1 is a schematic configuration diagram of an organic EL display device to which an embodiment of the display apparatus of the present invention is applied.

Hereinafter, an organic EL display device to which an embodiment of the pixel circuit and display apparatus of the present invention is applied will be described with reference to the accompanying drawings. FIG. 1 is a schematic configuration diagram of the organic EL display device to which an embodiment of the present invention is applied.

As shown in FIG. 1, the organic EL display device includes active matrix substrate 10 having multiple pixel circuits 11 disposed thereon two-dimensionally, each for holding charges according to a data signal outputted from a data drive circuit, to be described later, and applying a drive current to organic EL element according to the amount of charges held therein, a data drive circuit 12 that outputs a data signal to each pixel circuit 11 of the active matrix substrate 10, and a scan drive circuit 13 that outputs a scanning signal to each pixel circuit 11 of the active matrix substrate 10.

Active matrix substrate 10 further includes multiple data lines 14, each for supplying the data signal outputted from data drive circuit 12 to each pixel circuit column and multiple scanning lines 15, each for supplying the scanning signal outputted from scan drive circuit 13 to each pixel circuit row. Data lines 14 and scanning lines 15 are orthogonal to each other, forming a grid pattern. Each pixel circuit 11 is provided adjacent to the intersection between each data line and scanning line.

Figure 2:
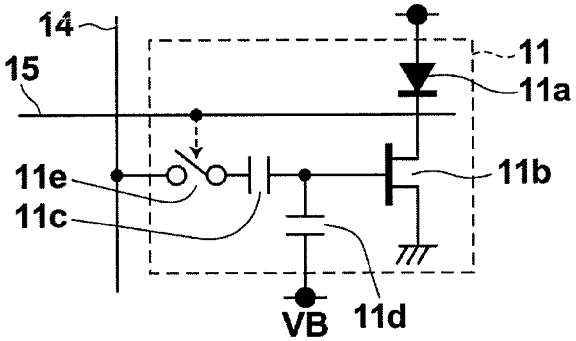
FIG. 2 is a pixel circuit of the organic EL display device to which an embodiment of the display apparatus of the present invention is applied, illustrating the configuration thereof.

As shown in FIG. 2, each pixel circuit 11 includes organic EL element 11*a*, a holding circuit having first capacitor element 11*c* and second capacitor element 11*d*, switching transistor 11*e* connected between the holding circuit and data line 14 and performs ON/OFF operations based on the scanning signal outputted from scan drive circuit 13 to establish a short circuit connection between data line 14 and holding circuit or to separate them from each other, and driving transistor 11*b* that receives, at the gate terminal, a voltage according to the amount of charges stored in second capacitor element 11*d* of the holding circuit and applies a drive current to organic EL element 11*a* according to the voltage applied to the gate terminal.

Figure 3:
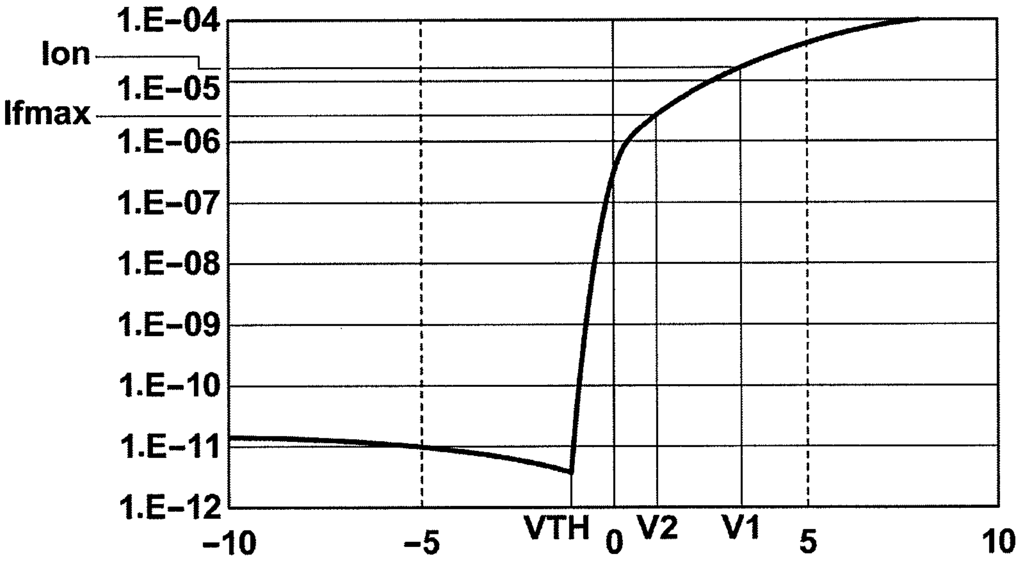
FIG. 3 shows one example characteristic of an inorganic oxide thin film transistor.

Driving transistor 11$b$ and switching transistor 11$e$ are inorganic oxide thin film transistors whose OFF-operation threshold voltage is a negative voltage. The term "OFF-operation threshold voltage" as used herein refers to gate-source voltage VGS at which drain current ID start increasing rapidly, and the term "OFF-operation threshold voltage is a negative voltage" as used herein refers to that the transistor has, for example, a VGS-ID characteristic like that shown in FIG. 3. The threshold voltage in the VGS-ID characteristic shown in FIG. 3 is VTH. As for the inorganic oxide thin film transistor, for example, a thin film transistor of inorganic oxide film made of IGZO (IngaZnO) may be used, but the material is not limited to IGZO, and ZnO and the like may also be used.

First capacitor element 11$c$ is connected between switching transistor 11$e$ and the gate terminal of driving transistor 11$b$, and second capacitor element 11$d$ is connected between a point located between first capacitor element 11$c$ and the gate terminal of driving transistor 11$b$ and a voltage source that supplies negative voltage VB. That is, the capacitor elements 11$c$ and 11$d$ are arranged such that the amount of charges according to the data signal inputted through switching transistor 11$e$ are dividedly stored therein. In addition, the voltage source is connected to the terminal of second capacitor element 11$d$ opposite to the terminal connecting driving transistor 11$b$ and negative voltage VB is supplied to second capacitor element 11$d$.

Scan drive circuit 13 is a circuit that outputs ON-scan signal $V_{scan(on)}$ and OFF-scan signal $V_{scan(off)}$ for turning ON and OFF switching transistor 11$e$ of pixel circuit 11 respectively.

Data drive circuit 12 is a circuit that outputs a data signal according to a display image to each data line 14.

Conditions for appropriately operating pixel circuit 11 shown in FIG. 2, including capacitance value C1 of capacitor element 11$c$, capacitance value C2 of second capacitor element 11$d$, negative voltage VB supplied to second capacitor element 11$d$, data signal supplied from data drive circuit 12, scanning signal supplied from scan drive circuit 13, and the like will now be described in detail.

Gate-Source voltage VGS2 of the driving transistor in pixel circuit 11 having the configuration shown in FIG. 2 may be expressed as follows.

$$VGS2=(V_{data}-VB)\times C2/(C1+C2)+VB$$

where, $V_{data}$ is the voltage value of the data signal supplied from data drive circuit 12.

Further, where driving transistor 11$b$ and switching transistor 11$e$ have the GVS-ID characteristic shown in FIG. 3 and VGS for causing driving transistor 11$b$ and switching transistor 11$e$ to perform OFF operation is threshold VTH, the condition of gate-source voltage VGS1 for causing switching transistor 11$e$ to perform OFF operation may be obtained in the following manner.

$VGS1=V_{scan}(off)-V_{data}\leqq VTH$, and if $V_{scan}(off)=0$ v, then $VGS1_{min}=-V_{datamin}\leqq VTH$, thus $V_{datamin}\geqq -VTH$. Here, $V_{datamin}$ is a minimum setup value of the data signal outputted from data drive circuit 12.

Next, where the data signal outputted from data drive circuit 12 has the minimum setup value of $V_{datamin}$, the condition of gate-source voltage VGS2 of driving transistor 11$b$ for causing organic EL element 11$a$ to stop the emission by causing driving transistor 11$b$ to perform OFF operation may be obtained in the following manner.

$$VGS2=(V_{datamin}-VB)\times C2/(C1+C2)+VB\leqq VTH, \text{ and if } V_{datamin}=-VTH \text{ from the formula above, then}$$

$VB\leqq(1+2\times C2/C1)\times VTH$ is obtained as the condition.

Next, where the VSG of driving transistor 11$b$ is V2 for causing organic EL element 11$a$ to emit light with maximum brightness (for applying drive current $I_{fmax}$ shown in FIG. 3 to organic EL element 11$a$), the condition of gate-source voltage VGS2 of driving transistor 11$b$ may be obtained in the following manner.

$$VGS2=(V_{datamax}-VB)\times C2/(C1+C2)+VB\geqq V2, \text{ thus}$$

$V_{datamax}=(V2\times(C1+C2)-VB\times C1)/C2$ is obtained as the condition. Here, $V_{datamax}$ is a maximum setup value of the data signal outputted from data drive circuit 12.

Then, where the VGS for causing switching transistor 11$e$ to perform ON operation is V1 (for flowing current $I_{on}$ shown in FIG. 3 as ID), the condition of gate-source voltage VGS1 of switching transistor 11$e$ may be obtained in the following manner.

$$VGS1=V_{scan(on)}-V_{datamax}\geqq V1, \text{ thus}$$

$V_{scan(on)}\geqq V1+V_{datamax}$ is obtained as the condition.

Description will now be made by assigning specific values to the formulae above.

Where characteristics of driving transistor 11$b$ and switching transistor 11$e$ are $$VTH=-1V,$$

$$V1=+3V, \text{ and}$$

$$V2=+1V,$$

the ratio between capacitance value C1 of first capacitor element 11$c$ and capacitance value C2 of second capacitor element 11$d$ is $$C2=2\times C1, \text{ and}$$

OFF scan signal $V_{scan(off)}$ is $$V_{scan(off)}=0 \text{ v, then}$$

values of the data signal, VB, and ON-scan signal $V_{scan(on)}$ are calculated as follows by the formulae above.

$$V_{datamin}=-VTH=+1 \text{ v}$$

$$VB=(1+2\times C2/C1)\times VTH=-5 \text{ v}$$

$$V_{datamax}=(V2\times(C1+C2)-VB\times C1)/C2=+4 \text{ v}$$

$$V_{scan(on)}=V1+V_{datamax}=+7$$

Next, an operation of the organic EL display device according to the present embodiment will be described.

First, data signals according to a display image are outputted from data drive circuit 12 and inputted to respective data lines 14 connected to data drive circuit 12. It is noted that the data signals are outputted sequentially from data drive circuit 12 as voltage waveforms, each corresponding to the display pixel of each pixel circuit connected to each data line 14. The output period of the voltage waveform with respect to each pixel circuit is set in advance.

In this way, as the data signal is outputted from data drive circuit 12 to each data line 14, an ON-scan signal generated according to the period of the data signal outputted from data drive circuit 12 for each pixel circuit is outputted from scan drive circuit 13 to each scanning line 15.

Figure 4:
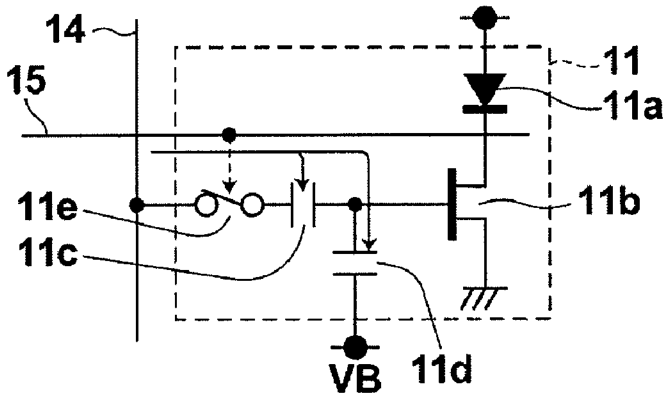
FIG. 4 illustrates charging operation of a capacitor element.

Then, as shown in FIG. 4, switching transistor 11$e$ is turned ON in response to the ON-scan signal outputted from scan drive circuit 13, and a short circuit connection is established between first capacitor element 11$c$ and data line 14, whereby charges according to the data signal for one pixel flowing out to data line 14 are dividedly stored in first capacitor element 11$c$ and second capacitor element 11$d$.

Then, according to the period of data signal outputted from data drive circuit 12, switching transistors 11*e* are sequentially turned ON with respect to each pixel circuit row, whereby charges according to the data signal are stored in first capacitor element 11*c* and second capacitor element 11*d* of each of all pixel circuits 11.

In this way, the charge storage is performed with respect to each pixel circuit row, and then charge holding operations are performed sequentially from the charged-up pixel circuit row.

Figure 5:
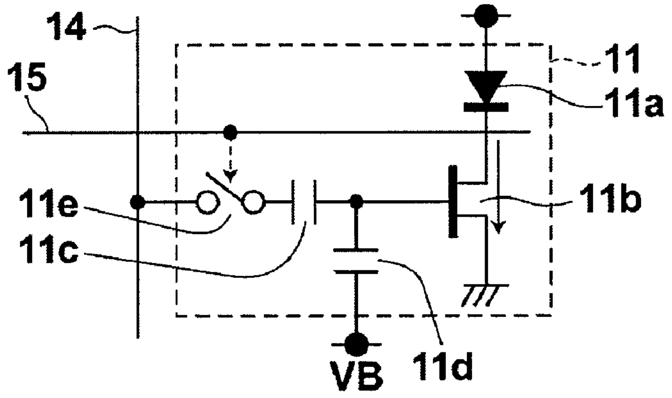
FIG. 5 illustrates holding and discharging operations of the capacitor element.

More specifically, an OFF scan signal is outputted from scan drive circuit 13 to each scanning line 15, and the switching transistor of each pixel circuit 11 is turned OFF in response to the OFF scan signal, whereby first capacitor element 11*c* is disconnected from data line 14, as shown in FIG. 5.

Then, a voltage according to the charges dividedly stored in first capacitor element 11*c* and second capacitor element 11*d* is supplied to the gate terminal of driving transistor 11*b*. Then, a drain current according to the supplied gate voltage flows through driving transistor 11*b*, which also flows as the drive current of organic EL element 11*a*, whereby organic EL element 11*a* emits light with brightness according to the data signal.

In this way, the data signal writing is performed sequentially for each pixel circuit row, and light is emitted sequentially.

The operation of pixel circuit 11 will now be described in more detail using the specific values calculated above.

First, gate-source voltage VGS1 of switching transistor 11*e* and gate-source voltage VGS2 of driving transistor 11*b* are calculated at the time when organic EL element 11*a* is in non-emission state using the values described above. From $V_{scan(on)}=+7$ v and $V_{datamin}=+1$ v, $$VGS1=+6\text{ v},$$

thus, switching transistor 11*e* performs ON operation and $V_{datamin}$ is applied across first capacitor element 11*c* and second capacitor element 11*d*.

Then, $$VGS2=(V_{datamin}-VB)\times C2/(C1+C2)+VB=-1\text{ v},$$

thereby causing driving transistor 11*b* to perform OFF operation, hence the organic EL element 11*a* does not emit light.

Next, gate-source voltage VGS1 of switching transistor 11*e* and gate-source voltage VGS2 of driving transistor 11*b* are calculated when organic EL element 11*a* is in an emission state with maximum brightness using the values described above. From $V_{scan(on)}=+7$ v and $V_{datamax}=+4$ v, $$VGS1=+3\text{ v},$$

thus, switching transistor 11*e* performs ON operation and $V_{datamax}$ is applied across first capacitor element 11*c* and second capacitor element 11*d*.

Then, $$VGS2=(V_{datamax}-VB)\times C2/(C1+C2)+VB=+1\text{ v},$$

thereby drain current ID of driving transistor 11*b* becomes $I_{fmax}$ and organic EL element 11*a* emits light with maximum brightness.

Next, gate-source voltage VGS1 of switching transistor 11*e* is calculated when first capacitor element 11*c* and second capacitor element 11*d* are in a charge signal holding state. From $V_{scan(off)}=0$ v, $V_{data}=V_{datamin}$ to $V_{datamax}=+1$ to $+4$ v, $$VGS1=-1\text{ to }-4\text{ v},$$

thus, switching transistor 11*e* is turned OFF, whereby gate-source voltage VGS2 of driving transistor 11*b* may be maintained.

Figure 6:
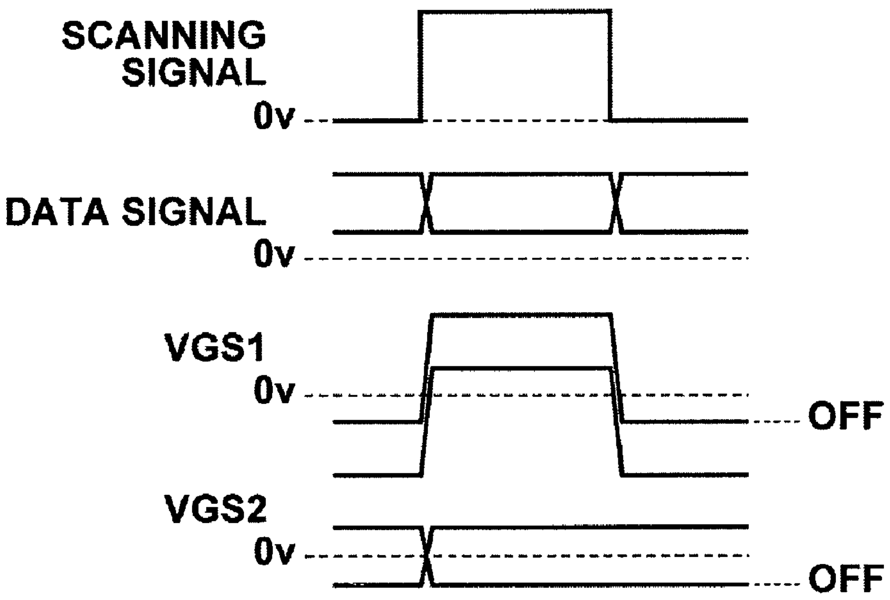
FIG. 6 illustrates voltage waveforms of scanning signal and data signal, and voltage waveforms of gate-source voltage VGS1 of a switching transistor and gate-source voltage VGS2 of a driving transistor.

Waveforms of scanning signal and data signal set at the aforementioned values, and voltage waveforms of VGS1 and VGS2 at that time are schematically illustrated in FIG. 6. The upper waveform of VGS1 is a voltage waveform when the organic EL element is in a non-emission state, and the lower waveform thereof is a voltage waveform when the organic EL element is in an emission state with maximum brightness. FIG. 6 shows that even when the organic EL element is set to a non-emission state, where VGS1 becomes a maximum value, switching transistor 11*e* can be caused to perform OFF operation. Further, even if the data signal is positive when the organic EL element is set to a non-emission state, VGS2 can cause the drive transistor to perform OFF operation, thereby causing organic EL element to become a non-emission state.

Comparative discussion will now be made between a conventional pixel circuit having a VGS-ID characteristic like that shown in FIG. 7, that is, a pixel circuit using a thin film transistor whose OFF-operation threshold voltage is positive is used as the driving transistor and the pixel circuit of the present embodiment described above.

The power consumption of the driving transistor depends on drain-source voltage VDS, and there is not any difference in VDS between the configuration of the conventional pixel circuit and that of the pixel circuit of the present embodiment. But, in the pixel circuit of the present embodiment, gate voltage VG of the driving transistor is divided by the first and second capacitor elements, so that the amount of current consumption in the charge and discharge operations of the capacitor element is increased by the voltage division ratio in comparison with the conventional pixel circuit. But, the organic EL elements, driving transistors, data drive circuit, and scan drive circuit are the main factors of the power consumption of the active matrix organic EL display device. Accordingly, the charge and discharge power for the capacitor elements of 1 p or less is insignificant in comparison with them.

In the embodiment of the present invention described above, driving transistor 11*b* is turned OFF by a negative voltage by dividing the gate voltage between first capacitor element 11*c* and second capacitor element 11*d*, but the circuit configuration is not limited to this and any other circuit configuration may be employed if it is capable of turning OFF driving transistor 11*b* by a negative voltage.

The embodiment of the present invention described above is an embodiment in which the display apparatus of the present invention is applied to an organic EL display device. But, as for the light emitting element, it is not limited to an organic EL element and, for example, an inorganic EL element or the like may also be used.

The display apparatus of the present invention has many applications. For example, it is applicable to handheld terminals (electronic notebooks, mobile computers, cell phones, and the like), video cameras, digital cameras, personal computers, TV sets, and the like.

What is claimed is:

1. A pixel circuit comprising:

a light emitting element, a driving transistor, connected to the light emitting element, that applies a drive current to the light emitting element, a holding circuit connected to a gate terminal of the driving transistor, and a switching transistor connected between the holding circuit and a data line through which a data signal to be held by the holding circuit flows, wherein:

the driving transistor and the switching transistor are inorganic oxide thin film transistors whose OFF-operation threshold voltage is a negative voltage; and the holding circuit includes a first capacitor element connected between the switching transistor and the gate terminal of the driving transistor, and a second capacitor element connected between a point located between the first capacitor element and the gate terminal of the driving transistor and a voltage source that supplies a negative voltage.

2. A display apparatus, comprising an active matrix substrate on which a pixel circuit is disposed in a large number, the pixel circuit comprising:

a light emitting element, a driving transistor, connected to the light emitting element, that applies a drive current to the light emitting element, a holding circuit connected to a gate terminal of the driving transistor, and a switching transistor connected between the holding circuit and a data line through which a data signal to be held by the holding circuit flows, wherein:

the driving transistor and the switching transistor are inorganic oxide thin film transistors whose OFF-operation threshold voltage is a negative voltage; and the holding circuit includes a first capacitor element connected between the switching transistor and the gate terminal of the driving transistor, and a second capacitor element connected between a point located between the first capacitor element and the gate terminal of the driving transistor and a voltage source that supplies a negative voltage;

a scan drive circuit that supplies to each switching transistor a scanning signal for turning ON/OFF each switching transistor; and a data drive circuit that supplies the data signal to be held by the holding circuit, wherein the scan drive circuit is a circuit that supplies a positive voltage as the scanning signal and the data drive circuit is a circuit that supplies a positive voltage as the data signal.

3. The display apparatus as claimed in claim 2, the negative voltage VB supplied to the second capacitor element, a capacitance C1 of the first capacitor element, a capacitance C2 of the second capacitor element, and the threshold voltage VTH satisfy the relationship of Formula (1) below, and a minimum setting value $V_{datamin}$ of the data signal, an OFF scan signal $V_{scan(off)}$, and the threshold voltage VTH satisfy the relationship of Formula (2) below, $$VB \leqq (1+2\times C2/C1)\times VTH \quad (1)$$

$$V_{datamin} \geqq V_{scan(off)} - VTH \quad (2).$$

* * * * *